United States Patent Office 2,931,773
Patented Apr. 5, 1960

2,931,773

METHOD OF DISPERSING CALCIUM CARBONATE IN LUBRICATING OIL

Charles E. Thompson, Ponca City, Okla., and Oscar L. Wright, McKees Rocks, Pa., assignors to Continental Oil Company, Ponca City, Okla., a corporation of Delaware No Drawing. Application October 18, 1956
Serial No. 616,599

9 Claims. (Cl. 252—18)

This invention relates to stable, oil-dispersible, highly basic, metal-containing inorganic compositions and methods of making the same. Such compositions possessing increased detergency and increased reserve basicity find especial utility as additives in lubricating oils and likewise are useful for producing corrosion inhibiting compositions and similar purposes.

It is believed that in heavy duty detergent type lubricating oil compositions for use in diesel and like internal combustion engines, at least two requirements must be met by such oils (in addition to lubricity, stability, and the like) if a high degree of engine cleanliness is to be maintained. First, the oil must possess the power to disperse insolubles formed by fuel combustion or oil oxidation, or both; and second, the oil must be capable of neutralizing acidic lacquer precursors formed by either oil oxidation or interaction of the oil with sulfur acids produced from fuel combustion, or both of these conditions. The detergents generally employed in oils for engine operation with high sulfur fuel (e.g., conventional metal sulfonates or phenates) are only mildly alkaline and their basicity it rapidly depleted during engine operation.

It is accordingly a principal object of this invention to provide metal-containing, stable dispersions of inorganic compounds in mineral oil and process for the production of such dispersions.

It is another object of this invention to provide highly useful mineral oil compositions utilizing such dispersions.

Other objects of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative however of but a few of the various ways in which the principle of the invention may be employed.

Broadly stated, the present invention comprises a process for the preparation of stable dispersions of calcium carbonate in lubricating oil compositions which comprises passing steam through a mixture comprising a lubricating oil, an oil soluble dispersing agent, and finely divided calcium cyanamide. Following hydrolysis of the calcium cyanamide the mixture is dehydrated which procedure removes other volatile components such as ammonia also.

Although we do not wish to be limited by any specific interpretation of what takes place chemically during the process of this invention, it is believed that on treatment of a suspension of calcium cyanamide in a lubricating oil with steam that ammonia is evolved and colloidal calcium carbonate is formed becoming a colloidal dispersion in the lubricating oil. Support for this interpretation may be found in the chemical literature such as F. Ephram, Inorganic Chemistry, Interscience Publishers Inc., 1954, page 636, where the reaction of calcium cyanamide and steam is given as $$CaCN_2 + 3H_2O \rightarrow CaCO_3 + 2NH_3$$

Before proceeding with specific examples illustrating this invention, it may be well to indicate in general the nature of the materials required in the process.

CALCIUM CYANAMIDE

We have found that either a commercial grade or a grade of higher purity of calcium cyanamide may be used in the process of our invention with almost equal facility provided th product is finely divided. This specification as to size (largest dimension of the particle) should not exceed 150 microns (through a 100-mesh screen). If the individual particles of the calcium cyanamide meet this size specification colloidal particles of calcium carbonate of a size of about 1 micron will be produced by the hydrolysis reaction. This is considerably below the size at which solid particles are abrasive between moving parts in engines, commonly considered to be about 5 microns.

LUBRICATING OILS

Lubricating oils in which the colloidal dispersions of calcium carbonate may be dispersed according to the present invention include a wide variety of lubricating oils and may be of mineral origin or synthetic. The lubricating oils of mineral origin include naphthenic base, paraffin base, and mixed base petroleum oils and oils derived from coal products. The synthetic lubricating oils include alkylene polymers, organic esters and inorganic esters such as for example polymers of ethylene, propylene and their mixtures, esters of dicarboxylic acids such as the butyl alcohol, hexyl alcohol, 2-ethylhexyl alcohol, dodecyl alcohol esters of adipic acid, azelaic acid, suberic acid, sebacic acid and alkyl succinic acid, and esters of phosphoric acid such as tricresyl phosphate.

OIL-SOLUBLE SURFACE ACTIVE AGENTS

A variety of oil-soluble, surface active agents including both ionic and nonionic forms may be used as the dispersing agent in the process of this invention. The sulfonates, organic phosphorus compounds, phosphorus sulfide treated olefins, and metal soaps of carboxylic acids are typical anionic surface active agents.

SULFONATES

Sulfonates which are suitable are oil-soluble and include alkyl sulfonates, alkaryl sulfonates, the so-called mahogany or petroleum soaps, and the like. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include non-aromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, however, require an alkyl portion totalling only about 18 carbon atoms. To attain the requisite oil solubility, therefore, requires that the hydrocarbon portion of the sulfonate have a molecular weight between about 350 and 1,000. Preferably this molecular weight is between 400 and 700. In this manner more than one metal may be introduced into the finished product, the excess metal introduced into the product being different from the metal of the sulfonate. Particularly useful sulfonates include diwaxbenzene sulfonates, diwaxtoluene sulfonates, and polydodecylbenzene sulfonates; barium and calcium diwaxbenzene sulfonates being preferred. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24. As the melting point of the wax decreases the carbon content of the mixture will average as low as 18 or a little lower.

Other sulfonates which may be used in the process of this invention include, for example, mono- and poly-wax substituted naphthalene sulfonates, diphenyl ether sulfonates, naphthalene diwulfide sulfonates, diphenyl amine sulfonates, dicetyl thianthrene sulfonates, dilauryl beta-naphthol sulfonates, dicapryl nitro-naphthalene sulfonates, unsaturated paraffin wax sulfonates, hydroxy substituted paraffin wax sulfonates, tetraamylene sulfonates, mono- and poly-chloro substituted paraffin wax sulfonates, nitrosoparaffin wax sulfonates; cycloaliphatic sulfonates such as lauryl-cyclo-hexyl sulfonates, mono- and poly-wax subtituted cyclo-hexyl sulfonates, and the like. The expression "petroleum sulfonate" is intended to cover all sulfonates derived from petroleum products.

Instead of using the foregoing sulfonates as such in the invention, we may also form those sulfonates in situ by adding the corresponding sulfonic acid to the mixture which then can be converted to the sulfonate by any convenient means. Generally, for convenience, such a modification is preferred. When this modified procedure is followed, we add from about 1½ to 6 times the quantity of the oil-insoluble inorganic compound than will react with the sulfonic acid thus insuring the presence of an inorganic compound in the product as a dispersoid.

ORGANIC PHOSPHORUS COMPOUNDS

Useful organic phosphorus compounds include tri- and penta-valent organic phosphorus acids and the corresponding thiophosphorus acids and their oil-soluble salts, as, for example, phosphoric acids and thiophosphoric acids, phosphinic acids and thiophosphinic acids, phosphonic acids and thiophosphonic acids, and the like and the oil-soluble salts thereof. The organic radicals substituted may be aliphatic, cycloaliphatic, aromatic, substituted aromatic, and the like and preferably contain a total of at least about 12 carbon atoms. Suitable phosphoric acid compounds include, for example, mono-wax phosphorus acids, mono-octadecyl phosphorus acid, monododecyl phosphorus acid, methyl cyclohexyl phosphite, capryl phosphite, dicapryl phosphite, zinc monowaxbenzene phosphonate, zinc dodecylbenzene phosphonate, and the like. Useful organic thiophosphorus acids include dicapryl dithiophosphoric acids, dilauryl dithiophosphoric acids, di-(methyl cyclohexyl) dithiophosphorus acids, lauryl monothiophosphoric acids, diphenyl dithiophosphoric acids, ditolyl monothiophosphoric acids, di-(iso-propylphenyl) monothiophosphoric acids, and the like, and the oil-soluble salts thereof.

PHOSPHORUS SULFIDE TREATED OLEFINS

The phosphorus sulfide treated olefins and their oil-soluble metal salts which are suitable for use include those customarily used in lubricating oil formulations as corrosion inhibitors and/or detergents. Specifically, they include the potassium-polyisobutylene-phosphorus sulfide products described by U.S. Patent 2,316,080, issued on April 6, 1943, to Loane and Gaynor and a similar material containing no metal made by addition of a phosphorus sulfide to wax olefins as described in U.S. Patent 2,516,119, issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide.

METAL SOAPS OF CARBOXYLIC ACIDS

Examples of specific soaps which are preferred for use because of cost and availability include metal soaps of naphthenic acids and the higher fatty acids.

Suitable naphthenic acid radicals include substituted cyclopentane mono- and di-carboxylic acids and cyclohexane mono- and di-carboxylic acids having at least about 15 carbon atoms for oil solubility, for example, cetyl cyclohexane carboxylic acids, dioctyl cyclopentane carboxylic acids; and dilauryl deca-hydronaphthalene carboxylic acids, and the like, and oil-soluble salts thereof.

Suitable oil-soluble fatty acid radicals include those in which there are present at least about 8 carbon atoms. The barium salts of the unsaturated and branched chain acids being oil-soluble with fewer aliphatic carbon atoms than the saturated acids. Specific examples are: 2-ethyl hexoic acid, linoleic acid, and the like. Substituted fatty acids which are useful may include chlorostearic acids, ricinoleic acids, and the like.

Similarly as in the case of the sulfonates, we may, instead of using the foregoing carboxylic acid soaps as such in the invention form those soaps in situ by adding the corresponding carboxylic acid to the mixture which then can be converted to the soap by any convenient means. When this latter procedure is followed, we add from about 1½ to 6 times the quantity of the oil-insoluble inorganic compound than will react with the carboxylic acid thus insuring the presence of an inorganic compound in the product as a dispersoid.

NONIONIC OIL-SOLUBLE SURFACE ACTIVE AGENTS

Suitable nonionic oil-soluble surface active agents for use in the process of our invention include: polyethylene glycol oleate, obtainable from General Aniline and Film Corporation under the trade name "Antarox B–100"; polyoxyethylene lauryl alcohol, obtainable from Atlas Powder Company under the trade name "Brij–30" which is an oily liquid having a viscosity of 25 to 125 centipoises at 25° C. and a specific gravity varying from .92 to .98; a condensation product of a polyglycol, fatty acid, and sodium sulfosuccinate acid obtainable from the Planetary Chemical Company under the trade name "D–Spers–O, W, PS, MO, Cl"; a lanolin derivative obtainable from the Atlas Powder Company under the trade name "G–1493"; a long chain fatty ester containing multiple ether linkages obtainable from Synthetic Chemicals, Incorporated, under the trade name "Mulsor"; a fatty amino compound obtainable from the Nopco Chemical Company under the trade name "Nopco 1219–A"; an alkylated aryl polyether alcohol obtainable from the Rohm and Haas Company under the trade name "Triton X–45"; and a dimeric alkylated aryl polyether alcohol obtainable from the Rohm and Haas Company under the trade name "Triton X–155."

The quantities of materials required in the process may vary over a wide range depending on the basicity desired in the product. The amount of calcium cyanamide used may be from about 0.25 to about 2.5 parts per part of surface active agent and a preferred range of from about 0.5 to 1.0 part of calcium cyanamide per part of surface active agent. The amount of lubricating oil that may be used may be from about 0.5 to 25 or more parts per part of surface active agent. The preferred range is from about 1 to 5 parts of lubricating oil per part of surface active agent.

The process is carried out by charging a reactor with the reagents and while agitating, heating the mixture to about 100 to 200° C. and introducing steam. Although steam at atmospheric pressure is operable, the reaction takes place more rapidly with pressure steam. Thus, with steam at atmospheric pressure the reaction is about 25% complete in 4 hours while with steam at 150 pounds per square inch the reaction is about 60% complete in 0.5 hour and complete in about 4 hours.

We have found that the reaction proceeds more readily in the presence of catalysts and antifoam agents. Suitable catalysts are those water soluble alkali metal salts having a basic reaction in water such as for example, sodium carbonate, potassium carbonate, sodium bicarbonate, potassium bicarbonate, lithium bicarbonate, sodium tetraborate, sodium acetate, sodium sulfide, and sodium phosphate. From about 1 to about 5 percent of the alkali metal salt is based on the calcium cyanamide. Suitable antifoam agents include antifoamant of the thickened methyl polysiloxane type such as sold under the trade name D.C. Antifoam A, polymerized glycols, pine oil, castor oil and various alcohols such as 2-ethylhexanol and diisobutyl carbinol. The antifoam agent may be used in an amount from about 5 to 1,000 parts per total parts per million of reagents.

In order to disclose the nature of this invention still more clearly the following illustrative examples are given in which parts are given as parts by weight. In the examples the numerical value preceding Pale Oil designates the S.S.U. value of the oil at 100° F. The base number of the products is the basicity of the product expressed in milligrams of potassium hydroxide per gram of sample. The procedure for determining the base number may be obtained by consulting Analytical Chemistry 23, 337 (1951), and 24, 519 (1952).

*Example 1*

A reactor equipped with an agitator and a gas inlet tube was charged with 1000 parts of 170 Pale Oil solution having dissolved therein 350 parts of the calcium salt of a synthetic alkaryl sulfonic acid prepared from a synthetic alkylaromatic hydrocarbon having an average molecular weight of 365 and 350 parts of agricultural grade calcium cyanamide. The mixture was heated to 100° C. and saturated steam passed in for 4 hours. The resulting mixture was cooled, diluted with 1000 parts of benzene, centrifuged to remove undispersed solids, and subjected to distillation to remove water and benzene. The resulting product had a base number of 3.

*Example 2*

The procedure of Example 1 was repeated with the exception that 20 parts of sodium carbonate was included in the charge. The resulting product had a base number of 29.

*Example 3*

An autoclave equipped with an agitator was charged with 175 parts of 170 Pale Oil, 100 parts of the sodium salt of the alkaryl sulfonic acid used in Example 1, 50 parts of calcium cyanamide (analyzing 69% $CaCN_2$, 24% $N_2$, 12% uncombined C and 15% calcium oxide), 1 part of sodium carbonate and 0.1 part of D.C. Antifoam A. The mixture was agitated and heated to 180° C. and steam at 150 p.s.i.g. introduced into the autoclave. At about 5-minute intervals, by means of a valve, steam containing ammonia was bled from the autoclave. After 4 hours, the autoclave was cooled, the product discharged and taken up in 200 parts of benzene, filtered using a filter aid, and subjected to distillation to remove water and benzene. There was obtained about 300 parts of a dark, clear fluid having a base number of 125.

*Example 4*

Example 3 was repeated with the exception that pressure steam was introduced for only 2 hours. The product has a base number of 111.

*Example 5*

Example 3 was repeated with the exception that pressure steam was introduced for only 0.5 hour. The product had a base number of 75.

*Example 6*

Example 3 was repeated with the exception that 100 p.s.i.g. steam was introduced for 4 hours. The product obtained had a base number of 92.

*Example 7*

An autoclave was charged with 50 parts of 170 Pale Oil, 100 parts of the sodium salt of the alkaryl sulfonic acid used in Example 1, 50 parts of calcium cyanamide, 1 part of potassium carbonate and 0.1 part of D.C. Antifoam A. Steam of 150 p.s.i.g. was introduced for 4 hours and intermittently bled off to remove ammonia. The product obtained had a base number of 120.

*Example 8*

An autoclave was charged with 500 parts of 170 Pale Oil, 100 parts of "Brij-30," a polyethylene oxylated lauryl alcohol, 50 parts of calcium cyanamide, 1 part of potassium carbonate and 0.1 part of D.C. Antifoam A. Steam at 150 p.s.i.g. was introduced for 4 hours and intermittently bled off to remove ammonia. The product obtained had a base number of 64.

As will be apparent from the foregoing examples, the presence of a small amount of sodium or potassium carbonate in the reaction mixture appears to act as a catalyst increasing the base number of the final product.

The products of this invention are useful as a component in lubricating oil compositions and as an additive to a petroleum wax or asphaltic material in the production of a corrosion inhibiting composition. Lubricating oil compositions were prepared by adding 5 parts of the product of Example 7 to 95 parts of a blend of SAE 30 lubricating oil containing a small amount of added sulfur as phosphorous pentasulfide treated wax olefin. The mixture was then heated to about 140° F. with agitation to obtain a uniform blend. Similar lubricating compositions were prepared using 5 parts of the products of Examples 2 to 5 in 95 parts of blends of the SAE 30 lubricating oil containing the phosphorous pentasulfide treated wax olefin.

The lubricating compositions thus produced together with the SAE 30 lubricating oil containing the phosphorous pentasulfide treated wax olefin as a control were subjected to cub engine tests. This test may be described briefly as follows: Four-cylinder cub gasoline engines (International's light tractor engine adapted to a stand test) are run for 40 hours at 2500 r.p.m. with 11 brake horsepower output and oil temperature of 280° F. and a jacket temperature of 200° F. After completion of the run, the engines are disassembled and the parts thereof are inspected. During the same operation one run was made using the SAE 30 oil containing the phosphorous pentasulfide treated wax olefin as a control. The engines using the lubricating oil compositions containing the products of this invention as additives showed less wear than the engine using the control lubricant.

It is apparent that many modifications and variations of the invention as hereinbefore set forth may be made without departing from the spirit and scope thereof. The examples given are by way of illustration only and the invention is limited only by the terms of the appended claims.

We claim:

1. The process of preparing stable dispersions of calcium carbonate, the particle size of said calcium carbonate not exceeding about 1 micron, in lubricating oil compositions, which comprises forming a mixture consisting essentially of 0.5 to 25 parts of a mineral lubricating oil, 1 part of oil-soluble dispersing agent, 0.25 to 2.5 parts of calcium cyanamide, the particles of which will pass through a 100-mesh screen, 1 to 5 percent of a basic water-soluble alkali metal salt, based upon the weight of calcium cyanamide contained therein, characterized further in that the anion of said alkali metal salt is selected from the group consisting of carbonate, bicarbonate, tetraborate, acetate, sulfide, and phosphate, and from about 5 to 1,000 parts per million per total parts of reagents of an antifoam agent, heating the mixture to a temperature of 100 to 200° C. and passing steam at 0 to 150 p.s.i.g. therethrough until conversion of calcium cyanamide to calcium carbonate is substantially complete and then removing the undispersed solids and water.

2. The process of claim 1 wherein the antifoam agent is characterized as being of the thickened methyl polysiloxane type.

3. The process of claim 2 wherein the antifoam agent is present in an amount within the range of 150 to 500 parts per million per total parts of reagents.

4. The process of claim 2 wherein the oil-soluble dispersing agent is ionic.

5. The process of claim 2 wherein the oil-soluble dispersing agent is nonionic.

6. The process of claim 2 wherein the oil-soluble dispersing agent is an oil-soluble sulfonate in which the hydrocarbon portion thereof has a molecular weight of between 350 and 1,000.

7. The process of preparing stable dispersions of calcium carbonate, the particle size of said calcium carbonate not exceeding about 1 micron, in lubricating oil compositions, which comprises forming a mixture consisting essentially of 1 to 5 parts of a mineral lubricating oil, 1 part of an oil-soluble dispersing agent, 0.5 to 1.0 part of calcium cyanamide, the particles of which will pass through a 100-mesh screen, 1 to 5 percent of a basic water-soluble metal salt, based upon the weight of calcium cyanamide contained therein, characterized further in that the anion of said alkali metal salt is selected from the group consisting of carbonate, bicarbonate, tetraborate, acetate, sulfide, and phosphate, and from about 5 to 1,000 parts per million per total parts of reagents of an antifoam agent, heating the mixture to a temperature of 100 to 200° C. and passing steam at 0 to 150 p.s.i.g. therethrough until conversion of calcium cyanamide to calcium carbonate is substantially complete and then removing the undispersed solids and water.

8. The process of claim 7 wherein the antifoam agent is characterized as being of the thickened methyl polysiloxane type.

9. The process of claim 8 wherein the antifoam agent is present in an amount within the range of 150 to 500 parts per million per total parts of reagents.

References Cited in the file of this patent

UNITED STATES PATENTS 2,079,051 Sullivan _____ May 4, 1937
2,671,758 Vinograd et al. _____ Mar. 9, 1954

OTHER REFERENCES

F. Ephram: Inorganic Chem., Interscience Pub. Inc. (1954), p. 636.